A. CARPENTER.
GANG PLOW.
APPLICATION FILED APR. 5, 1916.
1,308,744.
Patented July 1, 1919.
2 SHEETS—SHEET 2.
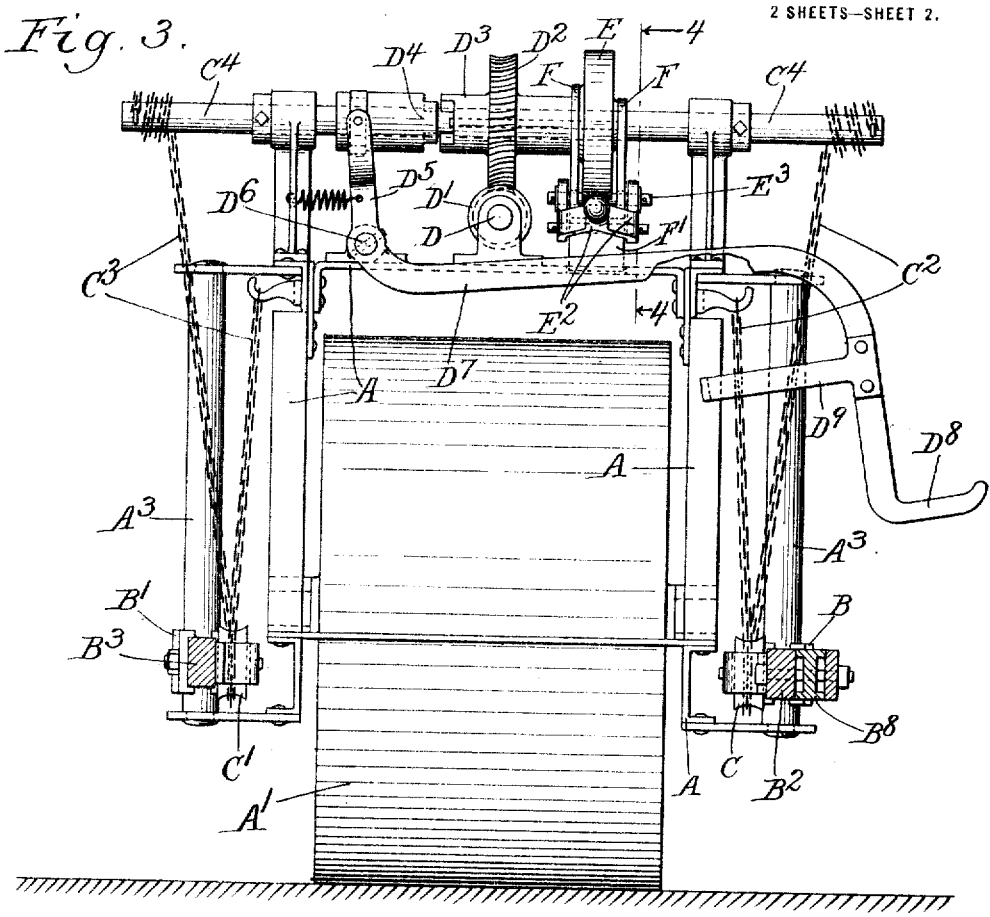
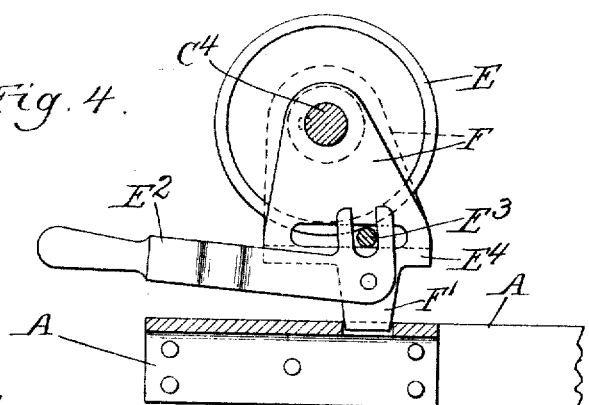
Witnesses
Edward F. Wray.
Esther Van Frank
Inventor.
Alexander Carpenter,
by Parker & Carter
Attorneys.

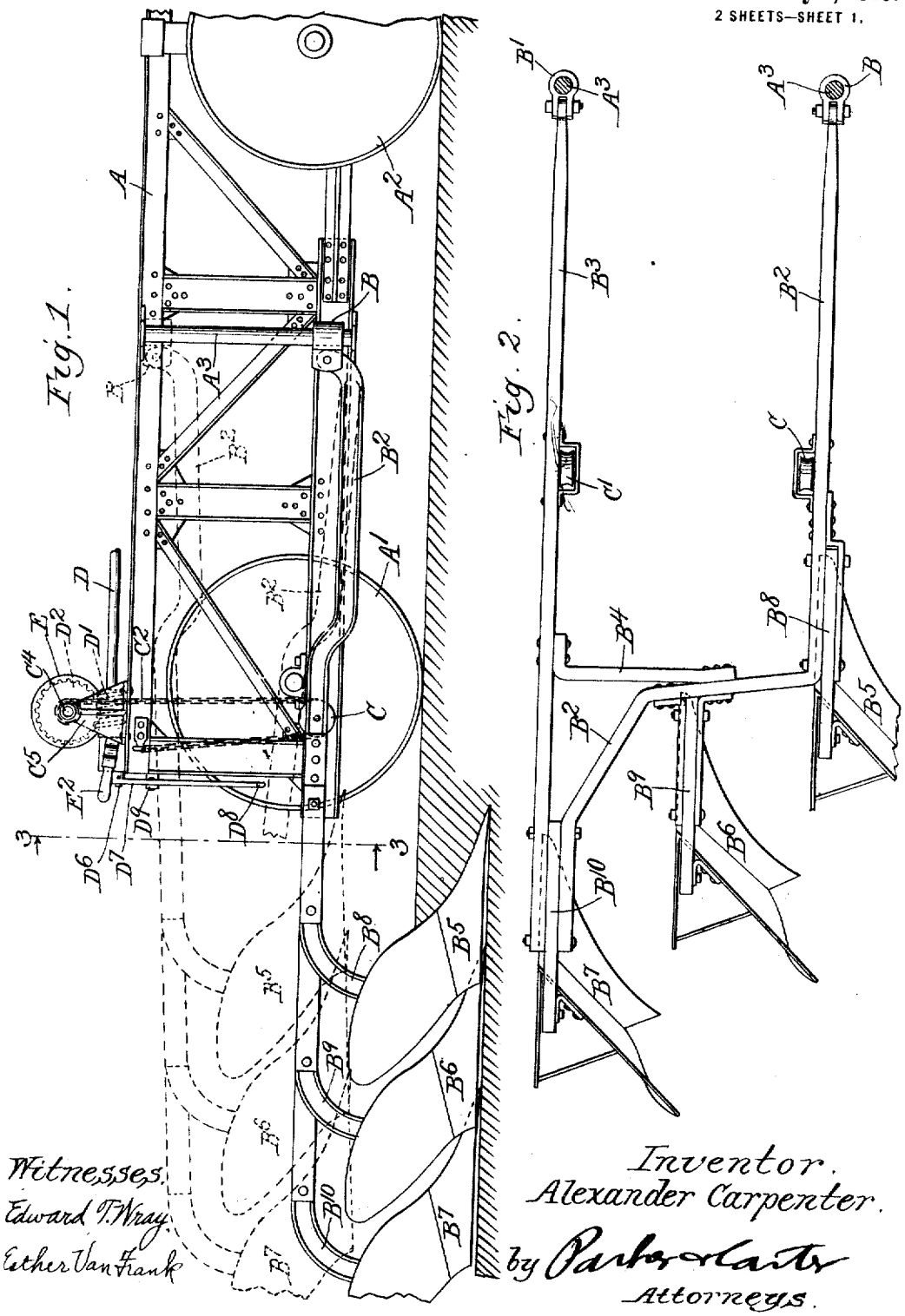

UNITED STATES PATENT OFFICE.

ALEXANDER CARPENTER, OF CAREY, OHIO, ASSIGNOR TO NATIONAL TRACTOR AND PLOW COMPANY, OF CAREY, OHIO, A CORPORATION OF OHIO.

GANG-PLOW.

1,308,744. Specification of Letters Patent. Patented July 1, 1919.

Application filed April 5, 1916. Serial No. 89,002.

*To all whom it may concern:*

Be it known that I, ALEXANDER CARPENTER, a citizen of the United States, residing at Carey, in the county of Wyandot and State of Ohio, have invented a certain new and useful Improvement in Gang-Plows, of which the following is a specification.

My invention relates to improvements in gang plows, particularly such gang plows as are mounted on and supported from a traction engine frame, although it will of course be understood that the gang plow itself and its associate parts might be mounted on any suitable size of plow frame. For the purpose of convenience I have illustrated my invention as making a part of a traction engine frame, but it must be understood that by gang plow I mean any plow or group of plows which in this connection are expected to be raised or lowered from the ground during the plowing operation.

The invention is illustrated more or less diagrammatically in the accompanying drawings, wherein—

Figure 1 is a side elevation showing the tractor frame and plows.

Fig. 2 is a plan view in detail of the plows alone with the plow beams and their associate parts.

Fig. 3 is a section along the line 3—3 of Fig. 1.

Fig. 4 is a detail section along the line 4—4 of Fig. 3.

Like parts are indicated by like letters in all the drawings.

A is a wheel tractor or plow frame supported on the wheels $A^1$, $A^2$, and propelled along the ground by any suitable means not here specifically shown. $A^3$, $A^2$ are vertical guide columns or bars rigidly mounted on the frame, and furnish a guide or track along which the collars B, $B^1$ may slide back and forth. Pivoted on the collars B, $B^1$ at $b$, $b$ are the plow beam side members $B^2$, $B^3$. These members extend back behind the frame, the member $B^3$ extending clear back, the member $B^2$ extending back far enough to clear the frame and there bent inwardly cause the member $B^3$ to meet a cross member $B^4$, which ties the member $B^2$ to the member $B^3$ immediately at the rear of the frame. The member $B^3$ continues on from the tied point gradually diagonally rearwardly to the extreme rear end of the member $B^3$ where the two members are tied together.

The plows $B^5$, $B^6$, $B^7$ are provided each with a short plow beam $B^8$, $B^9$, $B^{10}$, which beam is anchored on the loop or main plow beam as shown, so that the plows are arranged side by side one behind the other in the usual manner, and each plow and each beam is integral with the main plow beam, so that each plow is in effect mounted on a long rigid integral plow beam, the plows being arranged to raise and lower in unison.

Arranged intermediate the ends of the plow beam are the pulleys C, $C^1$. Chains $C^2$, $C^3$ anchored on the frame A pass down beneath the pulleys C, $C^1$ and up to a shaft $C^4$, which shaft is rotatably mounted in brackets $C^5$ on the frame A. These chains are anchored at the end of the shaft, so that a rotation of the shaft causes it to act as a windlass, winding up these chains and lifting the plows.

D is a drive shaft, driven by any suitable source of power not here specifically indicated. It carries worm $D^1$, rigidly mounted thereon. This worm is in mesh with a worm wheel $D^2$ rotatably mounted on the shaft $C^4$. This worm wheel $D^2$ carries a clutch $D^3$ in opposition to a clutch member $D^4$ splined on the shaft $C^4$ and adapted to be controlled by a clutch lever $D^5$. The clutch lever $D^5$ projects from a rock shaft $D^6$, which rock shaft carries a control lever $D^7$. The control lever has a foot pedal $D^8$ extending down at one side of the machine in such a position that the foot of the operator may easily manipulate and control it. $D^9$ is a throw-out lever projecting from the lever $D^7$ into the path of one of the members $B^2$, $B^3$, so that as the member is raised it will finally come in contact with the throw-out lever and throw the clutch lever back to disengage the clutch and permit the plow movement to cease.

The plows are held in the raised position by a clutch wheel E. This wheel has a smooth cylindrical surface and is keyed to the shaft $C^4$. It rotates in engagement with a friction ratchet member. The ratchet member comprises a bell-crank lever $E^2$ pivoted at its center. One arm of the lever projects rearwardly toward the operator; the other arm is forked to engage a hardened roller $E^3$. This roller, which is loosely held in the forks, rides upon an anvil E⁴ and is adapted to be thrust into engagement with both the smooth periphery of the wheel E³ and the smooth surface of the anvil so that the unsupported weight of the long arm of the lever tends yieldingly to thrust the locking roller into the wedge-shaped aperture between the wheel and the anvil. The arrangement of the parts is such that when the operator lifts up on the lever he disengages the roller from its locking position, permitting the weight of the plows to rotate the clutch wheel as they descend. When the parts operate to lock the wheel against rotation the wedging action takes place because the weight of the lever holds the roller always in engagement with both the wheel and the anvil so that the instant that a reverse movement of the wheel commences the roller is wedged to resist that movement of the wheel.

The anvil E⁴ is supported by a stirrup F. That stirrup is supported from the shaft C⁴, being attached thereto adjacent both sides of the clutch wheel E. The shaft is free to rotate with respect to the stirrup. F¹ is a lug projecting downwardly from the stirrup and engaging the machine frame so as to hold the stirrup against rotation. The lever E² being pivoted upon the stirrup, it will be evident that the distance between the anvil and shaft and the relation with respect to them of the lever, roller and wheel is always fixed; thus, the shaft can not spring to release the roller.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

The use and operation of my invention are as follows:

With the parts shown in the full line position, the plows will be plowing. The weight of the plow and the down-draft tend to hold the forward end of the plow beam at the bottom of the guide column, and the plow design itself causes the plow to drag through the ground at the proper plowing position. When the operator wishes to raise the plow, he operates the clutch in the usual manner connecting the driving shaft with the plow lifting windlass shaft. This pulls up on the chain and tends to raise the plows. The down draft of the plows themselves causes them to stay in the ground, and since there is but slight frictional resistance to the movement of the forward end of the plow beam along the guide bars, the forward end moves up and the plow beam is raised at its forward end. This tilts the plows up and they gradually rise out of the ground as the plow lift operates until they are completely free from the ground and find themselves in the position shown in dotted lines with the plow beam in the position substantially parallel to the position it assumes while plowing, but with plows and beam raised to the position where the plows are clear from the ground.

It will be understood that by this arrangement it is never necessary for the plow lifting mechanism to bodily lift the plows out of the ground while they are plowing. The plow lifting mechanism merely raises the forward end of the beam and is assisted by the movement of the plows themselves as they travel up owing to the upward inclination of the beam, so that much less power is needed than would be required to bodily rotate the plow beam about a fixed forward point and lift the plows out of the ground.

When the operator lowers the plow he releases the brake and permits the shaft to rotate allowing the plows to descend until they rest upon the ground. He continues the release of the shaft and the weight of the forward end of the plow beam tends to tilt the plow beam, the forward guide sliding down the shaft or column and into the position the guides occupy when plowing. This tilts the plow down and the plows gradually enter the ground without shock or material jar until they reach the position for which they were designed, when the parts will be in equilibrium and the plower will continue with the plow beam in the position shown in full line.

It will be understood that the operation of the mechanical lift is merely that when the operator presses the lever, the clutch is thrown in and the plow raising shaft rotates until the beam strikes the trip or stop lever on the operator's control lever and throws the clutch out. The ratchet stop for friction dog immediately goes to work and holds the plows in the raised position. The friction mechanism enables the operator to release the plows if so desired and ease them back until they strike the ground, or he may drop them. In any event, however, the plows will not suddenly penetrate the ground but will take hold gradually, thus greatly decreasing the strain both upon the plows and upon the tractor.

It will be understood of course, that the plow lifting chain and the pulley it applies to is more or less balanced between the plows and the beam, but is placed so far forward that the tendency is always for the beam to rise first when tension is put upon the chain or into the increased weight of the plows and owing to the down-draft which they exert.

It will be evident of course that one or more plows might be used. I have shown for preference three. Under the ordinary circumstances a three plow group is about what the farmer wants, but my invention could of course be applied to one plow or a multiplicity of plows, without changing its operation in any way, and in fact, owing to the characteristics whereby only a small part of the power which would otherwise be required is required to lift the plows. A relatively large number of plows may be easily manipulated without overstraining the mechanism.

The friction wheel, the anvil and the clamping roller all coöperate to instantly stop the rotation of the plow raising shaft when the power is released, but the pressure on the roller is such that the operator may, with a slight exertion of force lift the lever to draw the roller out of the locking position.

I claim:

1. The combination with a plow and beam of a vertical guide member upon which the forward end of the beam is freely slidable and there being horizontal pivotal connection between the beam and the connection sliding on the vertical guide, and plow lifting means connected with the beam intermediate its ends on such transverse line that the beam is free to rock with respect to such lifting means in a vertical plane as the plow is being lifted or lowered.

2. The combination with a plow and beam of a vertical guide member upon which the forward end of the beam is freely slidable and with which it is connected by a horizontal pivot, and plow lifting means located intermediate the ends of the beam, the beam being free to slide upon the guide member without interference between predetermined limits, the plow being located at the extreme rear end of the beam, and the latter being unsupported except for its connection with the said vertical guide and with the plow lifting means, whereby when the latter is brought into operation the beam turns about the horizontal pivot at the forward end of the beam.

3. The combination with a plow and beam of a vertical guide member upon which the forward end of the beam is slidably and pivotally mounted, and plow lifting means located intermediate the ends of the beam, the beam being free to rock with respect to such lifting means in a horizontal plane and to slide upon the guide member without interference between predetermined limits.

4. The combination with a plow and beam of means for rotating the beam about the rear end to tilt the plow, arresting the movement of the front end of the beam and raising the plow by rotating the beam about its front end, said means comprising a fixed guide upon which the forward end of the plow beam is mounted for free slidable and pivotal movement, and a raising mechanism attached to the beam at a single point intermediate its ends.

5. The combination with a plow and beam of means for rotating the beam about the rear end to tilt the plow, arresting the movement of the front end of the beam and raising the plow by rotating the beam about its front end, said means comprising a fixed guide upon which the forward end of the plow beam is mounted for free slidable and pivotal movement, and a raising mechanism attached to the beam at a single point intermediate its ends, the plow beam being free to rock with respect to such raising mechanism.

6. A supporting frame, vertical guides carried on either side thereof, a U-shaped plow beam having its forward ends one on either side of the frame and freely slidably and pivotally mounted on the guides, plows rigidly attached to the rear end of the beam, and unitary means interposed between the frame and the beam intermediate the ends thereof for raising and lowering the plows.

7. A supporting frame, vertical guides carried on either side thereof, a U-shaped plow beam having its forward ends one on either side of the frame and freely slidably and pivotally mounted on the guides, plows rigidly attached to the rear end of the beam, and unitary means interposed between the frame and the beam intermediate the ends thereof for raising and lowering the plows, the beam being free to tilt with respect to such means the sliding connections with the vertical guides meantime moving along the latter.

8. A combination with a supporting frame of a U-shaped plow beam the ends of which are slidably and pivotally mounted one on either side of the frame, plows carried by the beam, means comprising a shaft and means to rotate it, pulleys on the two sides of the beam and hoisting chains anchored at one end on the frame, passing over the pulley and attached at the other end on the ends of the shaft for raising the plows, the pulleys being located between the ends of the beams, and the anchored ends of the chains above the pulleys substantially as described, whereby draft on the chains by the rotation of the shaft while the plows are in the soil causes the front ends of the beams to be lifted along the vertical guide, insuring their gradually leaving the soil.

9. A combination with a plow frame of a U-shaped plow beam the ends of which are slidably and pivotally mounted, one on either side of the frame, plows carried by the beam, means comprising a shaft and means to rotate it, pulleys on the two sides of the beam and hoisting chains anchored at one end on the frame, passing over the pulley and attached at the other end on one end of the shaft for raising the plows, a clutch between the shaft and the rotating means and an operator controlled lever for manipulating said clutch together with means responsive to the upward movement of one of the beam parts for disengaging said clutch.

10. A combination with a plow frame of a U-shaped plow beam the ends of which are slidably and pivotally mounted, one on either side of the frame, plows carried by the beam, means comprising a shaft and means to rotate it, pulleys on the two sides of the beam and hoisting chains anchored at one end on the frame, passing over the pulley and attached at the other end on one end of the shaft for raising the plows, a clutch between the shaft and the rotating means, and an operator controlled lever for manipulating said clutch together with means responsive to the upward movement of one of the beam parts for disengaging said clutch, automatic frictional means for holding the plows in the raised position.

11. A combination with a plow frame of a U-shaped plow beam the ends of which are slidably and pivotally mounted, one on either side of the frame, plows carried by the beam, means comprising a shaft and means to rotate it, pulleys on the two sides of the beam and hoisting chains anchored at one end on the frame, passing over the pulley and attached at the other end on one end of the shaft for raising the plows, the location of the pulleys and anchored ends of the chains being such that when draft is applied to the chains to lift the plows from the soil, the forward ends of the beam are raised, a clutch between the shaft and the rotating means, and an operator controlled lever for manipulating said clutch together with means responsive to the upward movement of one of the beam parts for disengaging said clutch, automatic frictional means for holding the plows in the raised position, and means responsive to and controlled by the operator for releasing such holding means and permitting the plow to gradually descend.

12. The combination with a plow of a beam upon which it is rigidly mounted a guide upon which the forward end of the beam is mounted free to slide and rotate in a plane vertical and parallel with the normal movement of the plows, and a flexible plow lifting means attached to the beam intermediate the ends at such position on the beam that the weight of the plow end of the beam is always in position to overbalance the weight of the forward end of the beam, the plow-lifting means being located, with reference to their connection with the beam, in such position that a draft thereupon to lift the plows from the soil will tilt the beam, lifting the forward end until the plows clear the soil.

13. The combination with a plow of a beam upon which it is rigidly mounted, a guide upon which the forward end of the beam is mounted free to glide and rotate in a plane vertical and parallel with the normal movement of the plows and a flexible plow lifting means attached to the beam intermediate the ends at such position on the beam that the weight of the plow end of the beam is always in position to overbalance the weight of the forward end of the beam, and means for manipulating such plow lifting means to raise the forward end of the beam before the plow is taken from the ground, and to depress the forward end of the beam before the plow enters the ground.

In testimony whereof I affix my signature in the presence of two witnesses this 28th day of March 1916.

ALEXANDER CARPENTER.

Witnesses:
H. G. CHAMBERS,
C. C. KISSELLE.